United States Patent [19]

Barthelemy

[11] Patent Number: 4,839,440

[45] Date of Patent: Jun. 13, 1989

[54] N,N'-BIS(MALEIMIDE)/ALKENYLOXYANILINE COPOLYMERIZATE

[75] Inventor: Pascal Barthelemy, Lyons, France

[73] Assignee: Rhone-Poulenc Chimie, Courbevoie, France

[21] Appl. No.: 134,043

[22] Filed: Dec. 17, 1987

[30] Foreign Application Priority Data

Dec. 17, 1986 [FR] France ............................... 86 17917
Mar. 5, 1987 [FR] France ............................... 87 03205

[51] Int. Cl.$^4$ .............................................. C08F 22/40
[52] U.S. Cl. .................................... 526/262; 526/204; 528/322
[58] Field of Search ................. 526/262, 204; 528/322

[56] References Cited

U.S. PATENT DOCUMENTS 4,742,141 5/1988 Dien et al. ........................ 526/262

*Primary Examiner*—Harold D. Anderson
*Attorney, Agent, or Firm*—Burns, Doane, Swecker & Mathis

[57] ABSTRACT

Novel thermosetting imido copolymers having improved thermal properties and well adapted for the production, e.g., of molded and cellular shaped articles, and laminates, are formed from (a) at least one N,N'-bis(maleimide), (b) at least one alkenyloxyaniline, and (c) admixture of (i) at least one N-[(meth)allyloxyphenyl]maleimide with (ii) at least one N-[(meth)allyloxy-mono-/di(meth)allylphenyl]maleimide.

15 Claims, No Drawings

N,N'-BIS(MALEIMIDE)/ALKENYLOXYANILINE COPOLYMERIZATE

CROSS-REFERENCE TO RELATED APPLICATIONS

Copending applications, Ser. No. 06/880,838, filed July 1, 1986, Ser. No. 134,068, and Ser. No. 134,088, the latter two filed concurrently herewith and all assigned to the assignee hereof.

BACKGROUND OF THE INVENTION

1. Field of the Invention

The present invention relates to novel imido copolymers, and, more especially, to novel imido copolymers comprising the copolymerizate of at least one bis(maleimide), at least one alkenyloxyaniline and a mixture of N-(meth)allyloxyphenylmaleimides.

2. Description of the Prior Art

In published French patent application No. 85/16,971, filed Nov. 13, 1985, polymers containing imide groups are described which are produced by copolymerizing:

(a) an N,N'-bis(imide) or a combination of several bis(imides) having the formula:

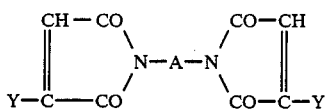

in which the symbol Y denotes H, CH₃ or Cl; the symbol A denotes a divalent radical selected from among: cyclohexylenes; phenylenes; 4-methyl-1,3-phenylene; 2-methyl-1,3-phenylene; 5-methyl-1,3-phenylene; 2,5-diethyl-3-methyl-1,4-phenylene; and the radicals of the formula:

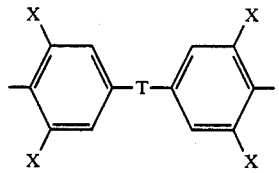

in which T denotes a single valence bond or an atom or group below:

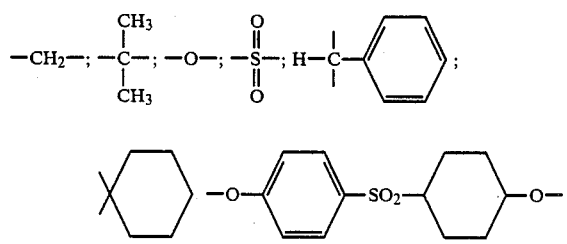

and X denotes a hydrogen atom or a methyl, ethyl or isopropyl radical; with (b) one or more alkenyloxyanilines of the formula:

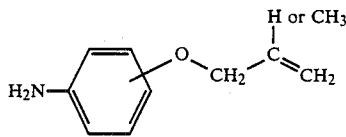

in which the allyloxy or methallyloxy radical is in the ortho, meta or para position relative to the carbon atom of the benzene ring that is bonded to the nitrogen atom; and, optionally, with (c) at least one other monomer copolymerizable therewith and having the formula:

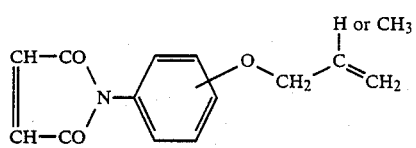

in which the allyloxy or methallyloxy radical is in the ortho, meta or para position relative to the carbon atom of the benzene ring bonded to the nitrogen atom.

One of the advantages of the invention described in the aforesaid French patent application is that it permits cured resins to be produced having properties which are in all respects as desirable as those of the poly(aminobismaleimides) described in French Pat. No. 1,555,564 (presently commercially available), without the need for precautions from health and hygiene standpoints during production and processing. Such precautions are ofttimes required during the production of the poly(aminobismaleimides) of the prior art, when the diprimary diamine used is aromatic in nature, on account of the toxicity which certain of these may possess.

In the aforementioned French patent application, it is noted that the addition, other than the bis(imide) (a) and the amino reactant (b), of the optional reactant (c) is a measure which enables the fluidity of the prepolymers to be increased and enhances the abrasion resistance and impact resistance of molded articles and shaped therefrom.

SUMMARY OF THE INVENTION

Accordingly, a major object of the present invention is the provision of improved polymerizable compositions wherein, in place of the optional reactant (c) described above, a different component is incorporated, the same comprising admixture of at least one N-(meth)allyloxyphenylmaleimide, e.g., N-(2-allyloxyphenyl)maleimide, N-(3-allyloxyphenyl)maleimide, N-(4-allyloxyphenyl)maleimide, N-(2-methallyloxyphenyl)maleimide, N-(3-methallyloxyphenyl)maleimide, and/or N-(4-methallyloxyphenyl)maleimide, with at least one mono-(meth)allylated comonomer and, optionally, at least one di-(meth)allylated comonomer.

Briefly, the present invention features novel imido copolymers comprising the copolymerizate of:

(a) at least one N,N'-bis(imide) having the above formula (I):

(b) at least one alkenyloxyaniline having the above formula (II); and (c) admixture of (i) at least one N-(meth)allyloxyphenylmaleimide having the structural formula:

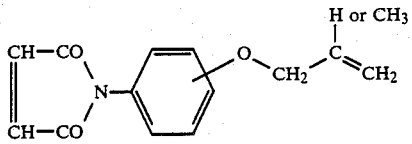

(III)

in which the allyloxy or methallyloxy radical is in the ortho, meta or para position relative to the carbon atom of the benzene ring bonded to the nitrogen atom, with:

(ii) at least one mono-(meth)allylated compound having the structural formula:

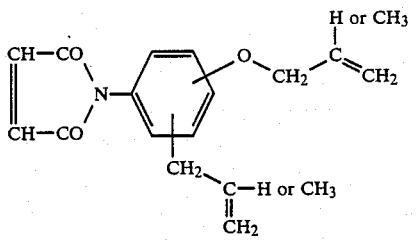

(IV)

and, optionally:

(iii) one or more di-(meth)allylated compounds having the structural formula:

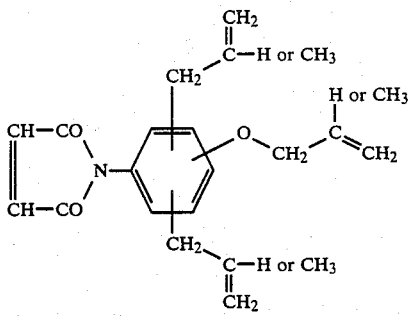

(V)

DETAILED DESCRIPTION OF THE PREFERRED EMBODIMENTS OF THE INVENTION

More particularly according to the present invention, the proportions of the various constituents in the mixture (c) of the compounds of formulae (III), (IV) and optionally (V) may vary over wide limits. Advantageously, the proportions of the constituents are selected from between the following limits (expressed as percentages by weight of each of the constituents in the mixture):

(1) at least 30%, and preferably from 50% to 80% of the N-(meth)allyloxyphenylmaleimide of formula (III);

(2) from 5 to 50%, and preferably from 10% to 35%, of the mono-(meth)allyl compound(s) of formula (IV); and (3) from 0% to 20%, and preferably from 0% to 15%, of the di-(meth)allyl compound(s) of formula (V), with the proviso that the sum of the constituents in each mixture is equal to 100% by weight.

It has also been found, unexpectedly, that an improved polymerization reaction medium having greater reactivity is provided by the present invention. Thus, surprising results are attained by reacting the reactants (a), (b) and, optionally, (c), in the presence of a suitable catalyst, with the optional reactant (c) either being the N-(meth)allyloxyphenylmaleimides referred to in the aforementioned French patent application 85/16,971 or the admixtures of the N-(meth)allyloxyphenylmaleimides with the (meth)allylated compound(s) described above.

Hence, the present invention also features polymers containing imide groups comprising the copolymerizate of:

(a) at least one N,N'-bis(imide) having the above formula (I);

(b) at least one alkenyloxyaniline having the above formula (II); and, optionally, (c) a copolymerizable reactant as described above; said copolymerization being carried out in the presence of an imidazole compound (d).

As regards the optional reactant (c) in this particular aspect of the invention, it is intended that same may either be the N-(meth)allyloxyphenylmaleimides referred to in the aforementioned French patent application No. 85/16,971, or the mixtures based on N-(meth)allyloxyphenylmaleimide and the (meth)allylated compound(s) described above.

The mixtures (c) according to the invention, based on N-(meth)allyloxyphenylmaleimide and the (meth)allyl-substituted derivative(s) thereof, are conveniently formulated, for example, by intimately admixing the constituents having the formulae (III), (IV) and optionally (V), said constituents being prepared separately.

The maleimides of formula (III) are conveniently prepared from aminophenols (ortho, meta or para), according to the Claisen reaction.

For example, an aminophenol (the amine group of which is first blocked by reaction with acetic anhydride such as to form acetamidophenol) can be reacted with an allyl or methallyl halide (most typically the bromide), as the case may be, dissolved in acetone and in the presence of dipotassium carbonate. The amine group is then regenerated by hydrolysis.

The corresponding maleimide is then prepared in conventional manner by reacting, in solution, previously prepared allyloxyaniline or methallyloxyaniline with maleic anhydride in the presence of acetic anhydride, triethylamine and a nickel salt (especially nickel acetate).

N-allyloxyphenylmaleimide or N-methallyloxyphenylmaleimide is thus produced.

N-(4-allyloxyphenyl)maleimide is a mustard yellow-colored solid having a melting point of approximately 103° C.

The NMR analysis is in agreement with the following structure:

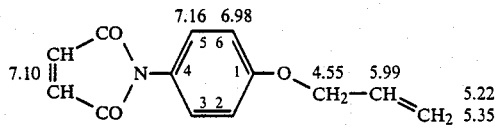

$^1$H NMR; solvent: DMSO d6; reference: hexamethyldisiloxane (HMDS): 7.16 (2H, m): H 3.5; 7.10 (2H, s): maleimido; 6.98 (2H, m): H 2.6; 5.99 (1H, m): —CH=; 5.35 and 5.22 (2H, dd): =CH$_2$; 4.55 (2H, d): OCH$_2$.

N-(3-allyloxyphenyl)maleimide is a viscous orange-yellow liquid which crystallizes slowly at ambient temperature and which boils at approximately 150° C. at a pressure of 20 Pa.

NMR analysis is in agreement with the following structure:

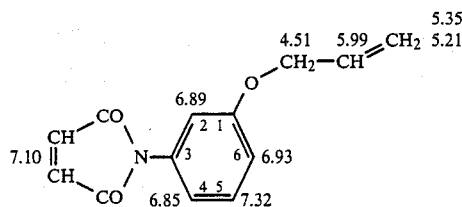

$^1$H NMR; solvent: DMSO d6; reference; HMDS 6.85, 6.89 and 6.93 (3H, m): H4, H2 and H6; 7.10 (2H, s): maleimido; 7.32 (1H, t): H5; 5.99 (1H, m): —CH=; 5.35 and 5.21 (2H, dd): =CH$_2$; 4.51 (2H, d): OCH$_2$.

N-(2-allyloxyphenyl)maleimide is a pale yellow crystalline solid having a melting point of approximately 82° C. and a boiling point of from 148° C. to 155° C. at a pressure of 20 Pa.

NMR analysis is in agreement with the following

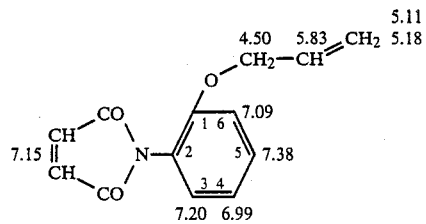

$^1$H NMR; solvent; DMSO d6; reference: HMDS 7.38 (1H, dt): H5; 7.20 (1H, dd): H3; 7.15 (2H, s): maleimido; 7.09 (1H, dd): H6; 6.99 (1H, dt): H4; 5.83 (1H, m): —CH=; 5.18 and 5.11 (2H, dd): =CH$_2$; 4.50 (2H, d): OCH$_2$.

N-(4-methallyloxyphenyl)maleimide is a beige-colored solid having a melting point of 64° C.

NMR analysis is in agreement with the following structure:

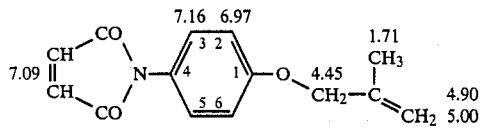

$^1$H NMR; solvent; DMSO d6; reference: HMDS: 7.16 (2H, d): H 3.5; 7.09 (2H, s): maleimido; 6.97 (2H, d): H 2.6; 4.90 and 5.00 (1H, s): CH$_2$=; 4.45 (2H, s): OCH$_2$; 1.71 (3H, s): CH$_3$.

N-(3-methallyloxyphenyl)maleimide is a beige-colored solid having a melting point of 39° C.

NMR analysis is in agreement with the following structure:

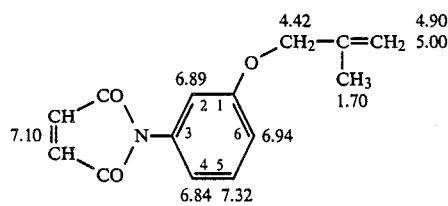

$^1$H NMR; solvent; DMSO d6; reference: HMDS: 7.32 (1H, t): H5; 7.10 (2H, s): maleimido; 6.94 (1H, d): H6; 6.89 (1H, s): H2; 6.84 (1H, d): H4; 4.90 and 5.00 (1H, l): CH$_2$=; 4.42 (2H, s): OCH$_2$; 1.70 (3H, s): CH$_3$.

N-(2-methallyloxyphenyl)maleimide is a beige-colored solid having a melting point of 96° C.

NMR analysis is in agreement with the following structure:

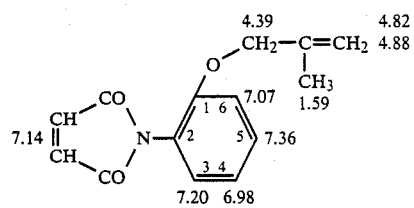

$^1$H NMR; solvent; DMSO d6; reference: HMDS: 7.36 (1H, t): H5; 7.20 (1H,d): H3; 7.14 (2H, s): maleimido; 7.07 (1H, d): H6; 6.98 (1H, t): H4; 4.82 and 4.88 (1H, s): CH$_2$=; 4.39 (2H, s): OCH$_2$; 1.59 (3H, s): CH$_3$.

In a preferred embodiment of the present invention, the mixture of N-(meth)allyloxyphenylmaleimide of formula (III) with one or more (meth)allyl-substituted derivatives of formula(e) (IV) and optionally (V) is in the form of a crude product resulting from the process described immediately hereinbelow.

This process is characterized in that it includes the following 3 stages, which are carried out in sequence in the same reactor:

(1) the first stage comprises reacting, in a solvent medium, an aminophenol with maleic anhydride, at a temperature ranging from 20° C. to 200° C., for a period of time ranging, depending on the temperature selected, from 30 minutes to 2 hours (this first stage provides a first reaction medium containing an N-(hydroxyphenyl)maleamic acid);

(2) the second stage comprises (meth)allylating the aforementioned acid by reacting said first reaction medium with a (meth)allyl halide, at a pH which must be adjusted and maintained at a constant value of from 7 to 14 by adding a defined amount of an aqueous alkaline solution, at a temperature ranging from 40° C. to 150° C. and after the acidification and removal of the aqueous phase (this second stage provides a second organic reaction medium containing an N-[(meth)allyloxyphenyl]-maleamic acid, one or more N-[(meth)allyloxy(meth)allylphenyl]maleamic acids and optionally one or more N-[(meth)allyloxydi(meth)allylphenyl]maleamic acids);

(3) the third stage comprises cyclizing the aforementioned maleamic acids by reacting said second reaction medium with an anhydride of a lower carboxylic acid, in the presence of a tertiary amine and optionally a catalyst, and then removing the reaction solvent (this third stage provides a crude reaction product which is a mixture formed from at least 30% by weight, and preferably from 50% to 80% by weight, of N-(meth)allyloxyphenylmaleimide, from 5% to 50% by weight, and preferably from 10% to 35% by weight, of one or more N-[(meth)allyloxy(meth)allylphenyl]maleimides and from 0% to 20% by weight, and preferably from 0% to 15% by weight, of one or more N-[(meth)allyloxydi(meth)allylphenyl]maleimides.

The 3 stages described above are carried out in sequence, in a single solvent, in order to achieve greater simplicity in the process; however, it is possible to change the solvent during any particular stage without encountering difficulty. The choice of solvent is very wide; however, as the second stage is performed in an aqueous/organic two-phase medium, it may be desirable to employ a water-immiscible organic solvent which simplifies considerably the treatment of the reaction mass. Exemplary of the water-miscible or -immiscible solvents which can be used, preferred are those which dissolve the starting aminophenol under the temperature conditions selected for the synthesis. Among these solvents, representative are, for example: alcohols (such as, for example, methanol, ethanol and butanol); ketones (such as, for example, acetone, methyl ethyl ketone and methyl isobutyl ketone); nitriles (such as, for example, benzonitrile, propionitrile and acetonitrile); esters (such as, for example, ethyl acetate and butyl acetate); aromatic solvents (such as, for example, anisole and chlorobenzene); and halogenated hydrocarbons (such as, for example, chloroform, dichloromethane and dichloroethane).

With respect to the first stage of the process, the concentration of the starting reagents in the solvent is not critical. However, for productivity reasons, it is neither advisable to dilute the reaction medium too much, nor is it advisable to concentrate it too much, for reasons of ease of stirring. In this first stage, maleic anhydride is employed in quantities at least equal to one mole per mole of aminophenol; larger quantities on the order of 1.01 to 1.5 moles per mole of animophenol are typically employed. Additionally, the temperature preferably ranges from 40° C. to 60° C.

With respect to the second stage, the amount of aqueous alkaline solution, for example, an aqueous NaOH solution, required, on the one hand, to salify the N-(hydroxyphenyl)maleamic acid and, on the other hand, to provide the desired pH, is first added to the reaction medium. The pH will be maintained constant throughout the reaction period by adding sodium hydroxide; preferentially, the pH is adjusted and maintained at a constant value of from 10 to 12. The allylation reaction is preferably carried out using (meth)allyl bromide or chloride. The quantity of (meth)allyl halide is on the order of 1.5 to 10 moles per mole of phenolic OH group and preferably on the order of 2 to 4. The excess of this reagent may be recovered at the end of the operation and recycled into a following operation. The period over which (meth)allyl halide is added is not critical and advantageously ranges from 1 hour to 5 hours and preferably from 2 hours to 4 hours. In this second stage, the temperature preferably ranges from 60° C. to 100° C. It should be noted that at the end of this stage, the aqueous phase is acidified to a pH of approximately 1 using common acids, preferably inorganic oxyacids or hydracids. The aqueous layer is removed and the organic layer remains in the reactor.

With respect to the third stage of the process, acetic anhydride is advantageously used as the lower carboxylic acid anhydride, in quantities at least equal to one mole per mole of HOOC—CH=CH—CO—NH— group to be cyclized. Larger quantities on the order of 1.05 to 1.5 moles per maleamic group are generally employed.

Exemplary of the tertiary amines suitable therefor, particularly representative are the trialkylamines and N,N-dialkylanilines in which the alkyl radicals contain from 1 to 12 carbon atoms. It is advantageous to employ triethylamine or N,N-dimethylaniline. The quantities of tertiary amine range from 0.05 to 2 moles per mole of HOOC—CH=CH—CO—NH— group.

Exemplary of the catalysts therefor, representative are the nickel salts or carboxylic acids, hydrated if required, and the chelated forms of such metal. The acetate and acetylacetonate are particularly well suited. These catalysts are employed in very small amounts, on the order of 0.05 to 1.5 per mole of HOOC—CH=CH—CO—NH— group and preferably on the order to 0.1 to 0.8 g.

In this third stage, the temperature is not critical and has no effect on the reaction rate. This temperature may, for example, range from 40° C. to 150° C. and preferably from 60° C. to 80° C. At the end of this stage, the solvent is removed by vacuum distillation and the crude reaction product, having the appearance of an oil, is obtained.

In a very preferred embodiment of the present invention, the process described above is very suitable for the preparation, beginning with meta-aminophenol, of mixtures based on the following compounds: N-[3-(meth)allyloxyphenyl]maleimide+N-[3-(meth)allyloxy-4-(meth)allylphenyl]maleimide+N-[3-(meth)allyloxy-6-(meth)-allylphenyl]maleimide+, where appropriate, N-[3-(meth)allyloxy-4,6-di-(meth)allylphenyl]maleimide.

It will be appreciated that using ortho-aminophenol as the starting material results in mixtures based on the following compounds: N-[2-(meth)allyloxyphenyl]maleimide+N-[2-(meth)allyloxy-3-(meth)allylphenyl]maleimide+N-[2-(meth)allyloxy-5-(meth)allylphenyl]maleimide+, where appropriate, N-[2-(meth)allyloxy-3,5-di-(meth)allylphenyl]maleimide.

It will also be appreciated that using paraaminophenol as the starting material results in mixtures based on the following compounds: N-[4-(meth)allyloxyphenyl]maleimide+N-[4-(meth)allyloxy-3-(meth)allylphenyl]maleimide+, where appropriate, N-[4-(meth)allyloxy-3,5-di(meth)allylphenyl]maleimide.

Exemplary of the bis-maleimides (a) having the formula (I) are those set forth in French patent application 85/16,971, namely:
N,N'-(meta-phenylene)bis(maleimide),
N,N'-(para-phenylene)bis(maleimide),
N,N'-(4,4'-diphenylmethane)bis(maleimide),
N,N'-(4,4'-diphenyl ether)bis(maleimide),
N,N'-(4,4'-diphenyl sulfone)bis(maleimide),
N,N'-(1,4-cyclohexylene)bis(maleimide),
N,N'-[4,4'-(1,1-diphenylcyclohexylidene)]bis(maleimide),
N,N'-[4,4'-(2,2-diphenylpropane)]bis(maleimide),
N,N'-(4,4'-triphenylmethane)bis(maleimide),
N,N'-(2-methyl-1,3-phenylene)bis(maleimide),
N,N'-(4-methyl-1,3-phenylene)bis(maleimide), and
N,N'-(5-methyl-1,3-phenylene)bis(maleimide).

These bis(maleimides) may be prepared according to the processes described in U.S. Pat. No. 3,018,290 and British Pat. No. 1,137,290. Among these bis-maleimides, N,N'-(4,4'-diphenylmethane)bis(maleimide), or mixtures thereof with N,N'-(2-methyl-1,3-phenylene)bis(maleimide), N,N'-(4-methyl-1,3-phenylene)bis(maleimide) or N,N'-(5-methyl-1,3-phenylene)bis(maleimide), are the more particularly preferred.

Exemplary of the alkenyloxyaniline comonomer (b), representative are those also set forth in said French patent application, namely:
2-allyloxyaniline,
3-allyloxyaniline,
4-allyloxyaniline,
2-methallyloxyaniline,
3-methallyloxyaniline,
4-methallyloxyaniline, and mixtures thereof.

These compounds may be prepared according to the processes described in the following references: *Journal of American Chemical Society*, 70, pages 592 50 594 (1948); *Chemical Abstracts*, 51, 4423 C (1957); *Journal of American Chemical Society*, 44, pages 1741 to 1744 (1922); *Bulletin de la Societe Chimique de France*, pages 2154 to 2157 (1962).

The amounts of N,N'-bis(imide) (s) (a), amino reactant (b) and, optionally, copolymerizable reactant (c) are selected such that the ratio r:

$$\frac{\text{total weight of imide reactants }(a) + \text{optionally }(c)}{\text{weight of the amino reactant }(b)}$$

ranges from 0.5:1 to 10:1, preferably from 1:1 to 5:1.

Moreover, the weight of copolymerizable reactant (c), when it is indeed present, constitutes up to 40% of the total weight of the reactants (a)+(b)+(c), and preferably from 5 to 30%.

The imidazole compound (d) corresponds to the following general formula:

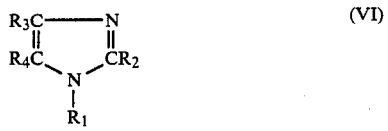

(VI)

in which $R_1$, $R_2$, $R_3$ and $R_4$, which may be identical or different, are each a hydrogen atom, an alkyl or alkoxy radical having from 1 to 20 carbon atoms, or a vinyl, phenyl or nitro radical, with the proviso that $R_3$ and $R_4$ may together form, with the carbon atoms from which they depend, a single ring member such as, for example, a benzene ring, and with the further proviso that $R_1$ may constitute a carbonyl group linked to a second such imidazole ring.

As specific examples of imidazole compounds (d), particularly representative are imidazole or glyoxaline, 1-methylimidazole, 2-methylimidazole, 1,2-dimethylimidazole, 1-vinylimidazole, 1-vinyl-2-methylimidazole, benzimidazole and carbonyldiimidazole.

The imidazole compound is used in catalytic quantities. Depending on the nature of the imidazole compound and depending on the rate of polymerization desired at the stage when the reaction is carried out, the imidazole compound is employed in a proportion of from 0.01 to 1% by weight relative to the total weight of the reactants (a)+(b)+, optionally, (c), and preferably from 0.05 to 0.5% by weight.

The general conditions for carrying out the present invention, as described in the aforesaid French patent application, are as follows:

The polymers according to the invention may be prepared by directly heating the bis(imide)(s) (a), the amino reactant (b) and, optionally, the reactant (c) with, if required the imidazole compound (d), at least until a homogeneous liquid mixture is produced. The temperature may vary according to the physical state of the compounds present, but generally ranges from 50° C. to 300° C. It is advantageous to convert the starting compounds to, and maintain them in, a state of intimate admixture before and during the heating, for example using efficient stirring. When the imidazole compound (d) is employed, the latter is preferably added, at the outset, to the well-stirred mixture of the reactants (a) and (b). When this compound is particularly active, in order to avoid its encapsulation in the polymer network formed, it is desirable to add it in a solvent or diluent which is compatible with the reaction medium. It may thus be advantageous to use either the amino reactant (b) itself, or one of the polar organic liquids referred to below as a solvent or diluent.

The preparation of the polymers according to this invention may be carried out by heating the mixture of reactants in an organic diluent which is liquid over at least part of the range 50° C.–250° C. Exemplary of such diluents, representative are, in particular, aromatic hydrocarbons such as xylenes and toluene, halogenated hydrocarbons such as chlorobenzenes, polar solvents such as dioxane, tetrahydrofuran and dibutyl oxide, dimethylformamide, dimethyl sulfoxide, N-methylpyrrolidone, dimethylacetamide, methyl glycol and methyl ethyl ketone. The solutions or suspensions of polymers may be employed as such for many applications; it is also possible to isolate the polymers, for example by filtration, where appropriate after precipitation by means of an organic diluent which is miscible with the solvent employed. In this context, it is advantageously possible to use a hydrocarbon, the boiling point of which does not substantially exceed 120° C.

It will be appreciated that the properties of the polymers according to the invention may vary widely, depending in particular on the exact nature of the reactants introduced, the proportions of reactants selected and the precise conditions of temperature adopted within the range stated above. As regards the polymers obtained, the latter may be cured polymers which are insoluble in the usual solvents such as, for example, the compounds mentioned in the preceding paragraph, and which do not exhibit significant softening below the temperature at which they begin to decompose.

However, these polymers can also be in the form of prepolymers (P) which are soluble in polar organic solvents and possess a softening point at a temperature below 200° C. (in general, this softening point is between 50° and 150° C.). These prepolymers may be obtained in bulk by heating the mixture of reactants until a homogeneous or pasty product is obtained, at a temperature generally ranging from 50° to 180° C., for a period of time which can range from a few minutes to a few hours, this period becoming shorter as the selected temperature is increased. Before the mixture of reactants is subjected to heating, it is advantageous, in this case also, to intimately mix its constituents beforehand, by stirring. In this case also, there is a preferred method for introducing the imidazole compound (d), this being the method described above in relation to the direct preparation of cured polymers. The preparation of the polymers may also be carried out in suspension, or in solution in a diluent which is liquid over at least part of the range 50°–180° C.

In cases where the optional reactant (c) is employed, it will be appreciated that these prepolymers (P) can also be obtained by forming, from the bis(imide)(s) (a) and the reactant (c), a prepolymer (PP) which is then reacted with the amino reactant (b) and, if required, the imidazole compound (d). It is also possible to prepare beforehand a prepolymer (P'P') by heating the mixture of amino reactant (b), reactant (c) and, if required, imidazole compound (d), and then reacting it with the bis(imide)(s) (a) to obtain the prepolymer (P). The conditions of temperature and time used for the preparation of the prepolymers (PP) or (P'P') and for their conversion to prepolymers (P) are those described above in relation to the preparation of the prepolymers (P), by directly mixing the reactants (a), (b) and, optionally, (c) with, if required, the imidazole compound (d).

The prepolymers (P) may be used in the bulk liquid state, simple hot casting sufficing for shaping and producing molded articles. It is also possible, after cooling and grinding, to use them in the form of powders which are exceptionally suitable for compression molding operations, optionally in the presence of fillers in the state of powders, spheres, granules, fibers or flakes. In the form of suspensions or solutions, the prepolymers (P) may be used for producing coatings and preimpregnated intermediate articles, the reinforcement of which may consist of fibrous materials based on aluminum silicate or oxide or zirconium silicate or oxide, carbon, graphite, boron, asbestos or glass. It is also possible to use these prepolymers (P) for producing cellular materials after the incorporation of a blowing agent such as, for example, azodicarbonamide.

In a second stage, the prepolymers (P) may be cured by heating to temperatures on the order to 300° C., generally between 150° and 300° C.; and additional shaping may be performed during the curing, optionally under vacuum or under a pressure above atmospheric pressure. It is also possible that these operations can be consecutive.

In cases where the optional reactant (c) is utilized, it is also within the ambit of the invention to prepare the polymers, which are not in the form of prepolymers (P), by employing an intimate mixture of prepolymer (PP), amino reactant (b) and, if required, imidazole compound (d), or an intimate mixture of prepolymer (P'P') and bis(imide)(s) (a), which is heated in bulk under the conditions described above.

The polymers according to the invention are of value in industrial applications requiring materials exhibiting good mechanical and electrical properties, as well as great chemical inertness at temperatures of 200° to 300° C. By way of examples, they are suitable for the manufacture of insulators in plate or tubular form for electrical transformers, printed circuit bases, pinions, rings, and the like. The preimpregnated articles are useful for the production of parts having a variety of shapes and functions in many industries such as, for example, in the aeronautical industry. These parts, referred to as laminates, which may be solids of rotation, are produced by depositing several layers of prepregs on a form or support. The prepregs can also be used as reinforcements or as a means of repairing damaged parts. Again appreciate that, in order to shape, for example, molded articles, it is possible to use either the mixture of the reactants or a prepolymer (P) as the starting material. When the mixture of the reactants is used directly as the starting material, this mixture is shaped into the desired final article and the curing is then carried out by heating. When the prepolymer (P) is used as the starting material, it may be molded by simple hot casing or by injection molding, and its curing is then effected by heating.

In order to further illustrate the present invention and the advantages thereof, the following specific examples are given, it being understood that same are intended only as illustrative and in nowise limitative.

EXAMPLE 1

This example illustrates production of an imido copolymerizate according to the present invention.

1. The following materials were introduced, at room temperature, into a glass reactor equipped with a side tube and an anchor type stirrer:

(i) 11.9 g of a composition comprising the following constituents: N-(3-allyloxyphenyl)maleimide+N-(3-allyloxy-6-allylphenyl)maleimide+N-(3-allyloxy-4-allylphenyl)maleimide+N-(3-allyloxy-4,6-diallylphenyl)maleimide (this composition was the crude reaction product prepared as described below in section 2);

(ii) 25.9 g of 3-allyloxyaniline.

The reaction was immersed in an oil bath heated to 140° C. After 1 minute of homogenization, 62.2 g of N,N'-(4,4'-diphenylmethane)bis(maleimide) were added under stirring at 140° C. over the course of 2 minutes [the ratio r was equal to 2.86:1 and the amount of the composition based on N-(3-allyloxyphenyl)maleimide constituted 11.9% of the total weight of the reactants]. The reaction mass became clear in 8 minutes. The mixture was cooled to 130° C. over 2 minutes and permitted to react for an additional 20 minutes at 130° C. A reduced pressure of approximately 130 Pa was then applied for 5 minutes.

The reaction mass was then poured into a mold preheated at 150° C. In this manner, plates were prepared having dimensions of 140×100×4 mm, which were subjected to the following curing cycle:
60 minutes at 150° C.
50 minutes at between 150° C. and 200° C.
2 hours at 200° C.
50 minutes at between 200° C. and 250° C.
16 hours at 250° C.
and 2 hours at between 250° C. and 25° C.

After release from the mold, the plates based on cured polymer were cut to prepare test pieces having dimensions of 30×7×4 mm, on which the flexural breaking strength (Sf) and the flexural modulus (Mf) were measured at 25° C. and at 250° C. (INSTRON apparatus with distance of 25.4 mm between supports):
at 25° C.:
Sf=200 MPa
Mf=3500 MPa
at 250° C.:
Sf=96 MPa
MF=2250 MPa A study of the dynamic viscosity of the prepolymer obtained at the time of casting at 70° C., using a rotational viscometer under a gradient of 189 $S^{-1}$, evidenced the following changes:

| Time (at 70° C.) | Viscosity (Pa.s) |
| --- | --- |
| 0 | 1.87 |
| 30 min | 1.95 |
| 1 hr, 00 min | 2.05 |
| 1 hr, 30 min | 2.15 |
| 2 hr, 00 min | 2.22 |
| 2 hr, 30 min | 2.3 |
| 3 hr, 00 min | 2.4 |
| 3 hr, 30 min | 2.55 |
| 4 hr, 00 min | 2.62 |
| 4 hr, 30 min | 2.8 |
| 5 hr, 00 min | 2.95 |
| 5 hr, 30 min | 3.1 |

2. This section describes preparation of a composition comprising a mixture based on N-(3-allyloxyphenyl)-maleimide and allylated derivatives thereof.

2.1. First stage:

A glass reactor equipped with a central stirrer, a reflux condenser, an electrode for measuring pH, a temperature measuring probe and a heating or cooling system was charged with the following:
(i) 186 g of maleic anhydride; and
(ii) 540 cm³ of methyl isobutyl ketone;
and the mixture was heated to 40° C.

A solution of 196 g of meta-aminophenol in 1.2 liter of methyl isobutyl ketone was prepared, and this solution was introduced over the course of 1 hour; during this time, the temperature increased from 40° C. to 60° C. After the introduction, the mixture was permitted to react at 60° C. for an additional 20 minutes.

At the end of this stage, N-(3-hydroxyphenyl)maleic acid was obtained. The yield was 100% with respect to the starting aminophenol.

2.2. Second stage:

720 cm³ of water and 240 cm³ of aqueous sodium hydroxide at a concentration of 30% by weight was added to the reaction medium obtained at the end of the first stage, and the pH of the medium was then adjusted to a value of 10.5 with the abovementioned aqueous sodium hydroxide. The temperature was then adjusted to 70° C. and 413 g of allyl chloride were introduced over the course of 4 hours. The temperature increased during this time period to 80° C. After the introduction, this temperature was maintained for an additional 2 hours. During the introduction of the allyl chloride, the pH was maintained at the value of 10.5 by injecting 30% strength aqueous sodium hydroxide.

At the end of this stage, the pH was adjusted to a value in the region of 1 by adding aqueous sulfuric acid solution at a concentration of 50% by weight. The aqueous phase was then removed by separation and an organic reaction mass weighing 2150 g was obtained.

The yield with respect to the hydroxyphenyl-maleamic acid was:
77% of N-(3-allyloxyphenyl)maleamic acid;
20% of N-(3-allyloxy-4-allylphenyl)maleamic and N-(3-allyloxy-6-allylphenyl)maleamic acids; and
3% of N-(3-allyloxy-4,6-diallylphenyl)maleamic acid.

2.3. Third stage:

3.2 cm³ of an aqueous solution containing 20% by weight of nickel acetate was added to the final medium of the second stage, and 72.5 cm³ of water remaining in the organic phase was distilled off azeotropically.

204 g of acetic anhydride and 51 g of triethylamine were then charged. The reaction mixture was heated to 65° C. for 1 hour, 30 minutes, and then cooled to 20° C. 800 cm³ of water were then added and the pH was adjusted to a value of 7 by adding 30% strength aqueous sodium hydroxide.

The aqueous phase was removed and the organic phase washed twice with 100 cm³ of water. The solvent of the organic phase was distilled off under reduced pressure to a value of $1.33 \times 10^2$ Pa at about 50°–60° C. 250 g of a viscous oil constituting the crude reaction product were thereby obtained.

The overall molar yield with respect to the starting material aminophenol was:
40% of N-(3-allyloxyphenyl)maleimide;
10% of N-(3-allyloxy-4-allylphenyl)maleimide and N-(3-allyloxy-6-allylphenyl)maleimide; and
1.5% of N-(3-allyloxy-4,6-diallylphenyl)maleamide.

The crude reaction product was a composition comprising a mixture of:
74.5% by weight of N-(3-allyloxyphenyl)maleimide;
21.8% by weight of N-(3-allyloxyallylphenyl)maleimide and N-(3-allyloxy-6-allylphenyl)maleimide;
and 3.7% by weight of N-(3-allyloxy-4,6-diallylphenyl)-maleimide.

EXAMPLE 2

This example illustrates the processing aspects of the present invention.

A mixture consisting of 12 g of 3-allyloxyaniline and 0.07 g of imidazole was introduced at room temperature into a glass reactor equipped with an anchor type stainless steel stirrer and a side tube enabling the volatile products to exit.

The reactor was immersed in an oil bath preheated to 160° C. After 2 minutes, 58 g of N,N-4,4'-diphenylmethane)bis(maleimide) were added under stirring over 3 minutes (the ratio r was equal in this case to 4.8:1). The reaction mass was then maintained under stirring for an additional 13 minutes, during the last 3 of which a reduced pressure of 1300 Pa was applied.

The prepolymer obtained was then molded, cured and tested as described above in Example 1. Before curing, the prepolymer (cooled and ground) was in the form of a yellow powder having the following characteristics: softening point, 54° C.; soluble to the extent of 50% by weight in N-methylpyrrolidone.

Results of flexion measurements on the test pieces of cured polymer:
at 25° C.:
$Sf = 209$ MPa
$Mf = 3240$ MPa
at 250° C.:
$Sf = 123$ MPa
$Mf = 2510$ MPa

EXAMPLE 3

A mixture consisting of 2.42 g of 3-allyloxyaniline and 0.01 g of imidazole was introduced at room temperature into the reactor used in Example 1 or 2. The reactor was immersed in a bath at 160° C. and 7.58 g of N,N'-(4,4'-diphenylmethane)bis(maleimide) were added over 1 minute (the ratio r was equal in this case to 3.1:1). After 10 minutes of reaction, the reaction mass was cooled and then ground. The prepolymer thereby obtained possessed a softening point of 48.6° C.; it was soluble to the extend of 50% by weight in N-methylpyrrolidone, and the collodion obtained was stable for at least 2 weeks at 25° C. (in the sense that no reprecipitation of the prepolymer was observed during this period). The gel time of the prepolymer at 160° C. was 14.4 minutes; it was measured using a SUNSHINE apparatus on a mixture of 10 g of the starting reactants: the zero time was defined by the instant of immersion of the tube containing this mixture in a thermostatted bath at the temperature of meaurement.

By way of comparative test, the operations described above were repeated but, on this occasion, in the absence of any imidazole compound. To achieve a softening point of 45° C., 30 to 35 minutes of reaction at 160° C. was then required. The collodion based on 50% by weight of prepolymer in N-methylpyrrolidone became cloudy after approximately 30 minutes. The gel time of the prepolymer at 160° C. was 1 hour, 5 minutes.

EXAMPLE 4

Using the prepolymer according to Example 2, a collodion was prepared containing 50% by weight of prepolymer in N-methylpyrrolidone. This collodion was used to coat a glass fabric manufactured by PORCHER (reference 7628), whose GSM was 200 g/m² and which had been subjected to treatment with UNION CARBIDE gamma-aminopropyltriethoxysilane A 1100. The impregnated fabric was dried in a ventilated atmosphere at 140° C. for 10 minutes. It was then cut into 6 rectangles (145×100 mm) which were stacked with two copper foils 35 micrometers thick, placed on the two outer face surfaces of the stack, and the assembly was placed between the plates of a press under the following conditions: heating 15 minutes at 160° C., followed by 1 hour, 15 minutes, at 180° C. under 40×10⁵ Pa; and 16 hours at 200° C. under atmospheric pressure.

The adhesion of the copper to the 6-ply laminate was examined: this adhesion, measured using an INSTRON dynamometer by pulling the copper at an angle of 90° (according to MIL Standard P 55 617 B at a rate of pull of 55 mm/min) was on the order of 17.6 N/cm.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A thermosetting imido polymer comprising the copolymerizate of (a) at least one N,N'-bis(maleimide), (b) at least one alkenyloxyaniline, and (c) admixture of (i) at least one N-[(methi)allyloxyphenyl]maleimide with (ii) at least one N-[(methy)allyloxy-(meth)allylphenyl]maleimide.

2. The thermosetting imido polymer as defined by claim 1, said admixture (c) further comprising (iii) at least one N-[(meth)allyloxy-di(meth)allylphenyl]maleimide.

3. The thermosetting imido polymer as defined by claims 1 or 2, said at least one N,N'-bis(maleimide) having the general formula (I):

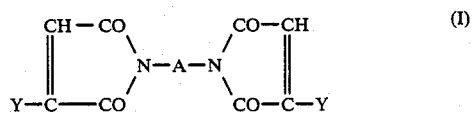

in which Y is H, CH₃ or Cl; and A is a divalent hydrocarbyl radical, or a radical of the formula:

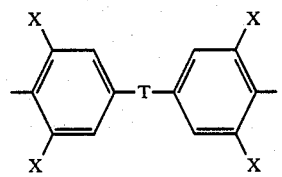

in which T is a single valence bond or T is an atom or group below:

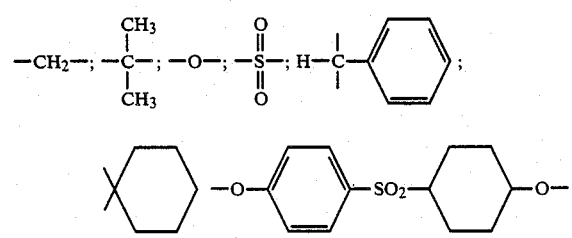

and X is a hydrogen atom or a methyl, ethyl or isopropyl radical.

4. The thermosetting imido polymer as defined by claim 3, said at least one alkenyloxyaniline (b) comprising (meth)allyloxyaniline.

5. A composition of matter comprising (a) at least one N,N'-bis(maleimide), (b) at least one alkenyloxyaniline, with or without an (c) admixture of (i) at least one N-[(meth)allyloxyphenyl]maleimide with (ii) at least one N-[(meth)allyloxy-(meth)allylphenyl]maleimide, and (d) an imidazole compound.

6. The composition of matter as defined by claim 5, said admixture (c) further comprising (iii) at least one N-[(meth)allyloxy-di(meth)allylphenyl]maleimide.

7. The composition of matter as defined by claim 5, said imidazole compound (d) having the general formula (VI):

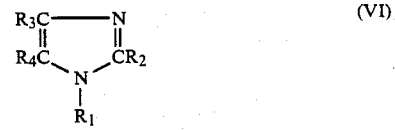

in which R₁, R₂, R₃ and R₄, which are identical or different, are each a hydrogen atom, an alkyl or alkoxy radical having from 1 to 20 carbon atoms, or a vinyl, phenyl or nitro radical, or R₃ and R₄ together form, with the carbon atoms from which they depend, a single ring member, or R₁ constitutes a carbonyl group linked to a second such imidazole ring.

8. The composition of matter as defined by claim 7, said imidazole compound (d) comprising imidazole; glyoxaline; 1-methylimidazole; 2-methylimidazole; 1,2-dimethylimidazole; 1-vinylimidazole; 1-vinyl-2-methylimidazole; benzimidazole; or carbonyldiimidazole.

9. The thermosetting imido polymer as defined by claim 3, said at least one N,N'-bis(maleimide) (a) comprising N,N'-(meta-phenylene)bis(maleimide); N,N'-(para-phenylene)bis(maleimide); N,N'-(4,4'-diphenylmethane)bis(maleimide); N,N'-(4,4'-diphenyl ether)bis(maleimide); N,N'-(4,4'-diphenyl sulfone)bis(maleimide); N,N'-(1,4-cyclohexylene)bis(maleimide); N,N'-[4,4'-(1,1-diphenylcyclohexylidene)]bis(maleimide); N,N'-[4,4'-(2,2-diphenylpropane)]bis(maleimide); N,N'-(4,4'-triphenylmethane)bis(maleimide); N,N40 -(2-methyl-1,3-phenylene)bis(maleimide); N,N'-(4-methyl-1,3-phenylene)bis(maleimide); or N,N'-(5-methyl-1,3-phenylene)bis(maleimide).

10. A prepolymer of the thermosetting imido polymer as defined by claim 3, soluble in polar organic solvents, and having a softening point at a temperature less than 200° C.

11. A thermoset, crosslinked polymer of the imido polymer as defined by claim 3.

12. A shaped article comprising the thermosetting imido polymer as defined by claim 10.

13. A shaped article comprising the thermoset imido polymer as defined by claim 11.

14. A process for the preparation of an imido polymer, comprising copolymerizing (a) at least one N,N'-bis(maleimide) with (b) at least one alkenyloxyaniline, with or without an, (c) admixture of (i) at least one N-[(meth)allyloxyphenyl]maleimide with (ii) at least one N-[(meth)allyloxy-mono-/di(meth)allylphenyl]-maleimide, in the presence of (d) a catalytically effective amount of an imidazole compound, and wherein the ratio between the total weight of the comonomers (a) and (c), when present, and the weight of the comonomers (b), ranges from 0.1:1 to 10:1.

15. The process as defined by claim 14, said ratio ranging from 1:1 to 5:1.

* * * * *